United States Patent [19]
Schneider
[11] 3,882,396
[45] May 6, 1975

[54] IMPEDANCE-MATCHED WAVEGUIDE FREQUENCY CONVERTER INTEGRALLY MOUNTED ON STRIPLINE

[75] Inventor: Martin Victor Schneider, Holmdel, N.J.

[73] Assignee: Bell Telephone Laboratories, Incorporated, Murray Hill, N.J.

[22] Filed: Aug. 10, 1973

[21] Appl. No.: 387,343

[52] U.S. Cl. ............. 325/445; 329/69 W; 333/98 R
[51] Int. Cl. ............................................ H03h 1/02
[58] Field of Search ........... 325/442, 445, 446, 449; 321/60, 69 R, 69 W; 333/32, 33, 98 R; 307/88.3; 332/51 W

[56] References Cited

UNITED STATES PATENTS 3,470,483 9/1969 Wagner et al. ................ 325/445 X
3,742,335 6/1973 Konishi .......................... 321/69 W

*Primary Examiner*—Benedict V. Safourek
*Attorney, Agent, or Firm*—Wilford L. Wisner; Daniel D. Dubosky

[57] ABSTRACT

In the disclosed millimeter-wave downconverter or detector, the detector diode is beam-leaded and integrally mounted on a stripline that is inserted in the waveguide. The diode is connected to the stripline by conductors forming a part of the stripline and is biased through d.c. bypass conductors without substantially affecting the stripline. The stripline is the transmission medium for the output signal. Tuning is accomplished by one or more movable dielectric plates inserted adjacent the stripline impedance for small inward travel and a primary effect on the waveguide impedance for larger inward travel. Precise impedance matching is facilitated.

10 Claims, 5 Drawing Figures

EQUIVALENT CIRCUIT

IMPEDANCE-MATCHED WAVEGUIDE FREQUENCY CONVERTER INTEGRALLY MOUNTED ON STRIPLINE

BACKGROUND OF THE INVENTION

This invention relates to demodulation or frequency downconversion techniques for microwave or millimeter-wave signals, particularly those employing a junction of a hollow waveguide and a stripline.

The conventional demodulation or downconversion unit that is mounted in a hollow waveguide is frequently fabricated as a wafer unit which is commonly known as the Sharpless wafer. For one example of such a wafer, see U.S. Pat. No. 3,141,141. The basic idea of such a diode mount is that the wafer unit can be inserted and moved transversely in a waveguide to obtain a resistive match to the guide; the reactive component of the diode impedance is then tuned out by an adjustable waveguide short or end plate behind the diode.

New techniques using photolithographic and integrated circuit processing steps to fabricate diodes have been developed in recent years. The diode terminals are fabricated with beam-leads which are subsequently contacted to the circuit by means of thermocompression bonds. See, for example, the article, "Beam-Lead Technology" by M. P. Lepselter in the *Bell System Technical Journal*, Vol. 45, p. 233 (Feb. 1966).

Such diodes cannot be easily inserted into a Sharpless wafer; and a different and more convenient way to contact the diode and to match it to the waveguide circuit has become desirable.

SUMMARY OF THE INVENTION

My invention provides the desired result of a millimeter-wave downconverter or detector in which the diode is beam-leaded and compatible with the new integrated circuit processing.

According to a feature of my invention, the diode is integrally mounted on a stripline that penetrates the waveguide and provides the transmission medium for the output signal. Tuning is accomplished by a movable dielectric plate inserted at least part-way into the waveguide adjacent to the stripline. The dielectric plate is adapted to be moved parallel to the plane of the stripline and is characterized by a primary effect on the stripline impedance for small inward travel toward the axis of the waveguide and a primary effect on the waveguide impedance for larger inward travel.

According to subsidiary features of my invention independent resistive and reactive impedance matching can be accomplished by two such plungers, or by just one in cooperation with other techniques, such as a waveguide short that has a movable spacing from the beam-leaded diode. Other such techniques include changing the drive or the bias on the diode.

BRIEF DESCRIPTION OF THE DRAWINGS

Further features and advantages of my invention will become apparent from the following detailed description taken together with the drawing, in which.

DETAILED DESCRIPTION

Figure 1:
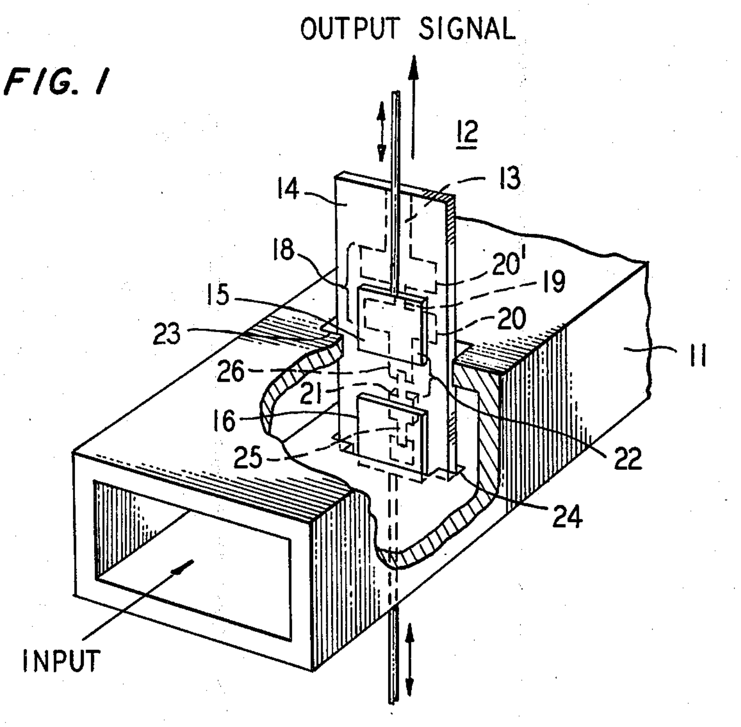
FIG. 1 is a pictorial illustration, partly in section, of a preferred embodiment of my invention.

The purpose of the embodiment of FIG. 1 is to make the new integrated circuit techniques compatible with the needed tuning and matching functions for the important communication process of demodulating or downconverting modulated millimeter-wave carrier waves. The combination of integrated circuit techniques and the matching techniques provides the following advantages:

1. The diode and its bias network are fabricated using integrated circuit processing steps.
2. The electrical properties of the diode, such as junction capacitance, spreading resistance and factor $n$ can be easily tested before inserting the quartz carrier into the waveguide circuit, where $n$ is defined by the forward conduction equation of a metal-semiconductor junction diode $$i = i_s \left[\exp\left(\frac{qV}{nKT}\right) - 1\right] \qquad (1)$$

with $q$ being the electron charge, $V$ the forward voltage, $K$ the Boltzmann constant, $T$ the absolute temperature, $i_s$ the saturation current and $i$ the forward current.

3. RF losses due to lossy electrical contacts are eliminated because the diode is capacitively coupled to the waveguide.
4. It is not necessary to move the diode carrier transversely within the waveguide to obtain a resistive match to the waveguide.

In the embodiment of FIG. 1 the millimeter-waveguide 11 is shown as rectangular waveguide with openings to admit the stripline 12 through its broader sidewalls. The stripline 12 is to serve as the output transmission medium for the demodulated or downconverted communication signal. The principal conductor 13 of the stripline is shown dotted because it is on the hidden surface of the stripline substrate 14, which is a dielectric such as fused quartz. The movable dielectric plungers 15 and 16, used for tuning the waveguide-stripline junction are shown disposed adjacent to the visible surface of the substrate 14 and opposite the conductor 13. The stripline conductor pattern of the conductor 13 consists of a lowpass filter 18 and terminal 26 which is connected to the beam-leaded diode 21. The lowpass filter 18 consists of a series connection of capacitive elements 20 and 20' and the narrowed-strip inductive element 19 therebetween. The beam leads 25 illustratively connect to respective different regions of diode 21, between which nonlinear conduction can occur.

The diode 21 is a beam-leaded Schottky barrier diode or other beam-leaded solid-state device with a suitable nonlinear characteristic for demodulation or for frequency downconversion.

The openings 23 and 24 in the broader waveguide walls for the stripline 12 are illustratively elongated transverse to the axis of the waveguide; but other alternatives are possible, particularly those involving insertion of the stripline through other sidewalls or an end wall of the waveguide. The width of the opening 23 or 24 is less than approximately half a wavelength of the wave propagating in the hollow waveguide 11 in all cases, so that the rectangular clearance or opening around the fused quartz substrate 14 is always below cutoff for waveguide propagation.

Figure 2:
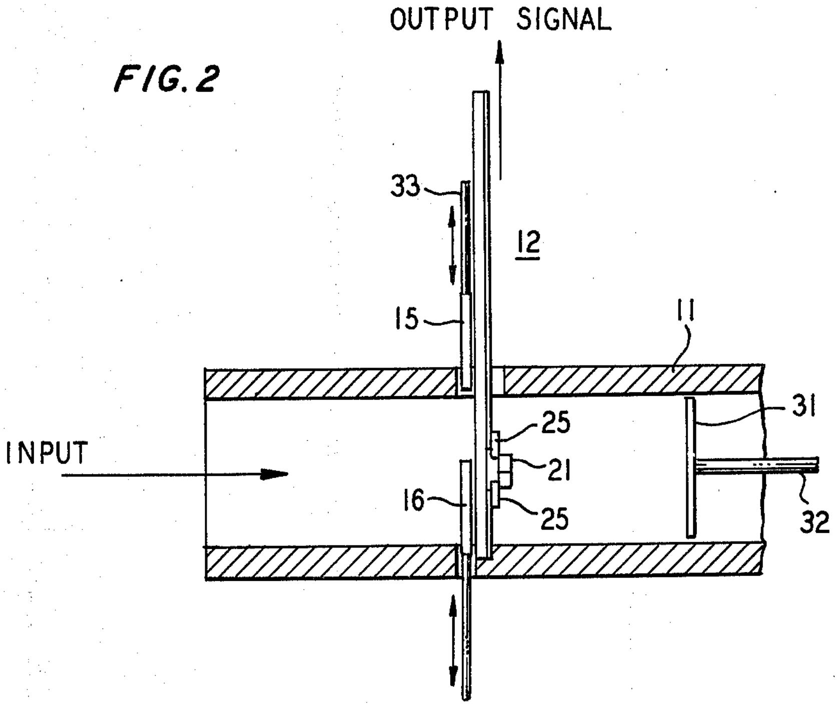
FIG. 2 is a cross-sectional elevation of the embodiment of FIG. 1 taken in a direction parallel to the waveguide axis.

The side cross-sectional elevation of the embodiment of FIG. 1 is shown on FIG. 2 in order to show more clearly the tuning and matching means, including the reflective adjustable waveguide short for end plate 31, which is illustratively disposed beyond diode 21 in the direction of millimeter-wave propagation by approximately a quarter wavelength or an odd multiple thereof, and is adjustable in position by means of its being mounted upon the axially oriented rod or plunger 32. The first dielectric tuning plate 15 is similarly mounted upon a rod 33 which may be translated along its axis to move the plate 15 parallel to the axis of the stripline to change the position of plate 15 with respect to the axis of the waveguide 11. Illustratively, dielectric plate 15 enters the waveguide wall in close proximity to stripline 12 and penetrates little or not at all into the interior of waveguide 11, so that it affects primarily the resistive component of impedance of the stripline. Such limited movement employs only a first part of the possible range of movement.

While it is purely optional, a second dielectric plate 16 can enter the waveguide 11 through the opposite wall and penetrate sufficiently far toward the waveguide axis that it exerts a primary effect on the waveguide impedance. In other words, a second and distinct part of the possible range of movement is employed. It will have effect both on the resistive and reactive components of the waveguide impedance as seen by the incoming modulated millimeter-wave which is propagating in the waveguide toward diode 21. Thus, coordinated movement of plates 15 and 16 can produce a resistive impedance match. There are also several other ways of obtaining the desired impedance match with respect to the reactive components of the stripline and waveguide impedances. For example, adjustment of the position of shorting plate 31 is usually sufficient for this purpose. In addition, an intermediate frequency drive applied through stripline 12 to the diode 21 for downconversion purposes can be changed, or the d.c. bias of diode 21 can be changed.

Figure 5:
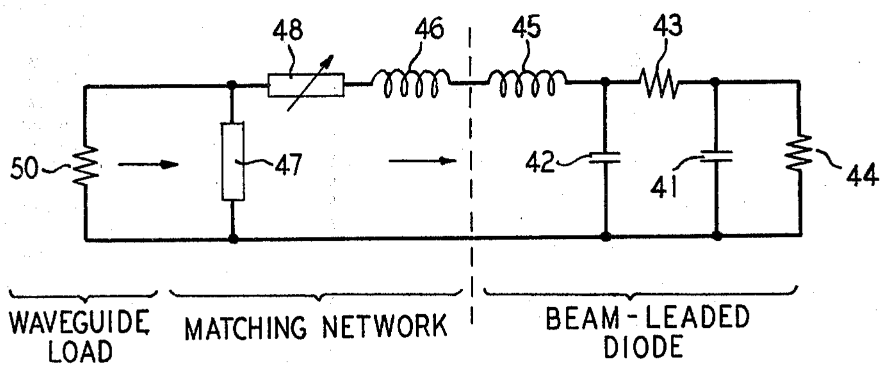
FIG. 5 is a schematic illustration of the equivalent circuit for the embodiments of my invention.

The equivalent circuit of the adjustable coupling network is shown in FIG. 5. The diode is characterized by a junction capacitance 41, a fringe field capacitance 42, a spreading resistance 43 and an equivalent loading resistance 44. The diode leads and the stripline leads extending into the waveguide are equivalent to a series inductance L which is given by $$L = L_{45} + L_{46} \qquad (2)$$

where $L_{45}$ is the series inductance due to the diode leads and $L_{46}$ the series inductance due to the stripline leads.

The diode inductance $L_{45}$ is given by $$L_{45} = 2 l_{45} ln \left( \frac{8}{\pi e^2} \frac{A}{w_D} \right) \text{nH} \qquad (3)$$

where $l_{45}$ is the total length of both beam lead terminals in cm, $w_D$ the width of the beam leads and $a$ the width of the rectangular waveguide. For a beam lead with a total length $l_{45} = 3 \cdot 10^{-2}$cm, a width $w_D = 0.5 \cdot 10^{-2}$cm and a WR-8 waveguide with $a = 0.2$ cm one obtains $L_{45} = 0.16$ nH. The remaining part of the series inductance due to the stripline is given by $$L_{46} = 4(b - l_{45}) F \left( \frac{A}{\lambda_o} \times \frac{w_M}{A} \right) \text{nH} \qquad (4)$$

where $b$ is the height of the waveguide in cm, $w_M$ the width of the stripline and $F(a/\lambda_o)$ $(w_M/a)$ a function which is derived in the MIT Waveguide Handbook by N. Marcuvitz, MIT Radiation Laboratory Series, Volume 10, pages 227–229, 1951,($F = X\lambda_g/Z_o a$). For $w_M = 4 \times 10^{-2}$cm, a WR-8 waveguide and a frequency of 100 GHz one obtains for $F = 0.38$ and $L_{46} = 0.11$ nH. The total inductance of the stripline with the beam-leaded diode is $L = 0.27$ nH. This corresponds to a reactance of 170 ohm at 100 GHz.

The stripline section between the top wall of the waveguide and the low-pass filter is equivalent to a section of a transmission line with an impedance Z and an effective length $l$ which is approximately equal to the distance between the top wall of the waveguide and the first capacitive section of the low-pass filter. The reactance 48 of this line section is given by $$JX = jZ \tan \frac{2\pi l}{\lambda} \qquad (5)$$

where $\lambda$ is the wavelength of the strip transmission line. The reactance 48, of value $jX$ can be varied by introducing a movable dielectric plate 16. The plunger reduces the line impedance and the wavelength by a factor k. If one inserts the plunger by a distance $l_1$ beyond the low-pass filter one obtains $$jX_1 = jZ \frac{\tan \frac{2\pi k \ell_1}{\lambda} + k \tan \frac{2\pi(\ell - \ell_1)}{\lambda}}{k + \tan \frac{2\pi(\ell - \ell_1)}{\lambda}} . (6)$$

It is possible to choose the dimensions of the stripline, the channel and the dielectric plunger in such a way that any positive or negative reactance may be obtained by adjusting the position of the sliding dielectric plunger. If some of the important diode parameters are known, it is usually satisfactory to vary $jX_1$ only over the positive reactance range from 0 to $+\infty$ or the negative reactance range from 0 to $-\infty$, e.g., for $k = 1.25$ and for a line length $l = \lambda$ the reactance will vary from 0 to $+\infty$, that is from a short circuit to an open circuit. It should be noted that the plunger has to be moved by a full wavelength in order to obtain a reactance change from a short to an open circuit which would be obtained by moving an adjustable metal short by quarter wavelength. This means that the fine tuning of a circuit by means of the dielectric plunger is easier because the mechanical tolerances of reaching the optimum position of the plunger are reduced by a factor $1/(k\text{-}1)$.

In some embodiments of the invention it is convenient to employ a conductive plunger tuning element (FIG. 2, element 31). The reactance introduced by this plunger is represented by reactance 47 of FIG. 5.

Matching of the impedance of the diode 21 and the stripline network 12 together to the impedance of the waveguide 11 can also be achieved by inserting the movable dielectric plate 15 into the waveguide 11. It is useful to use thickness of dielectric plates 15 and 16 which are slightly less than one-quarter wavelength in order to obtain a large reduction of the waveguide impedance if either is fully inserted into the waveguide, as illustratively the second dielectric plate 16 is shown.

The guide wavelength $\lambda_{g\epsilon}$ and the waveguide impedance $Z_\epsilon$ in the dielectric are given by $$\lambda_{g\varepsilon} = \frac{\lambda_o}{\sqrt{\varepsilon_r - \left(\frac{\lambda_o}{\lambda_c}\right)^2}} \quad (7)$$

$$Z_\varepsilon = \sqrt{\frac{\mu_o}{\varepsilon_o}} \frac{1}{\sqrt{\varepsilon_r - \left(\frac{\lambda_o}{\lambda_c}\right)^2}} \frac{2b}{a} \quad (8)$$

where $\epsilon_r$ is the relative dielectric constant of the substrate. Typical values for $\lambda_{g\epsilon}$, $Z_\epsilon$ and some other parameters are listed in Table I for a frequency of 100 GHz, a relative dielectric constant $\epsilon_r = 3.8$ and two waveguide sizes WR-10 and WR-8.

TABLE I

Electrical and Mechanical Parameters for f = 100 GHz and $\epsilon_r = 3.8$ (Silica)

| Electrical and Mechanical Parameters | WR-10 0.100" × 0.050" | WR-8 0.080" × 0.040" |
|---|---|---|
| Frequency Range | 75–110 GHz | 90–140 GHz |
| Cutoff frequency $f_c$ | 59 GHz | 73.84 GHz |
| Cutoff wavelength $\lambda_c$ | 0.509 cm | 0.406 cm |
| Guide wavelength $\lambda_{go}$ | 0.371 cm | 0.445 cm |
| Guide wavelength in dielectric $\lambda_{g\epsilon}$ | 0.161 cm | 0.166 cm |
| Guide impedance $Z_w$ | 466.3 Ω | 559.1 Ω |
| Guide impedance in dielectric $Z_\epsilon$ | 202.7 Ω | 208.8 Ω |
| Quarter wave impedance $Z'_W = Z_\epsilon{}^2/Z_W$ | 88.1 Ω | 78.0 Ω |
| Quarter wavelength $\lambda_{g\epsilon}/4$ | 0.0159" | 0.0164" |

It should be noted that the guide impedance is reduced substantially by using the dielectric material in front of the diode as a quarter wave impedance transformer. By inserting the dielectric plates 15 or 16 partially into the waveguide one obtains a tuning range from 500 to 80 Ω which is sufficiently wide to match to a wide range of diode impedance levels.

Figure 3:
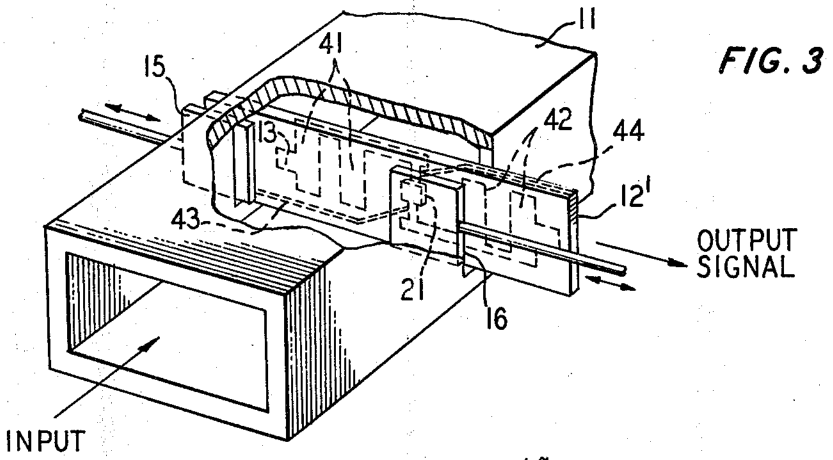
FIG. 3 is a pictorial illustration, partly in section, of a modified embodiment of my invention.
Figure 4:
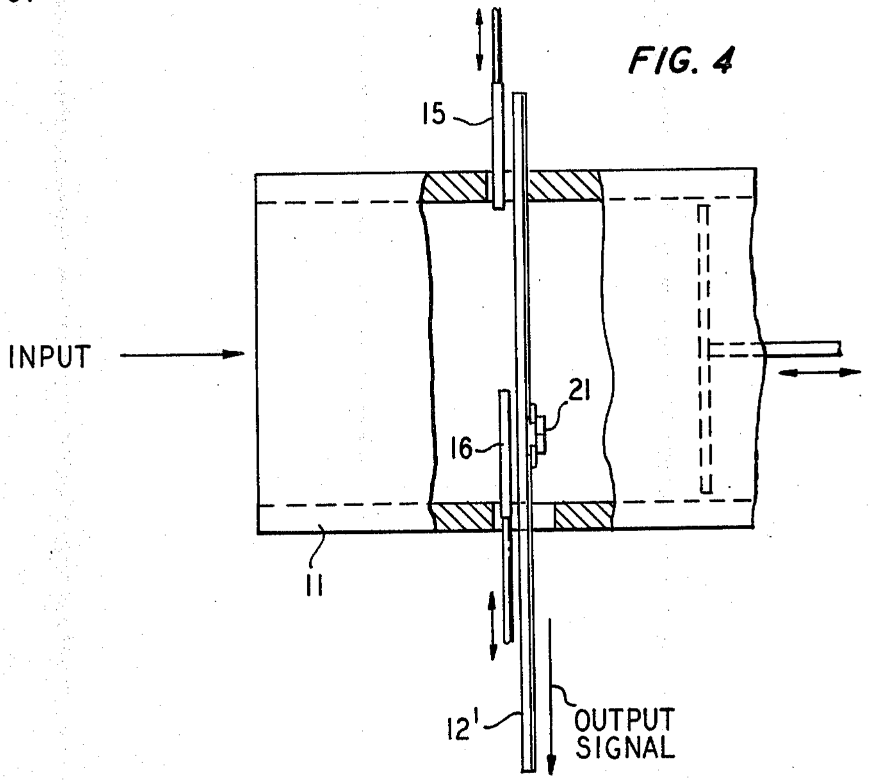
FIG. 4 is a cross-sectional elevation of the embodiment of FIG. 3, taken parallel to the waveguide axis.

In FIG. 3 and FIG. 4 components the same as those in FIGS. 1 and 2 are numbered the same; and the only major change is the change of the configuration of the filter circuits 41 and 42 and change in orientation in that the stripline 12' and the dielectric plungers 15 and 16 enter the waveguide 11 through the narrower sidewalls thereof, but with the openings still elongated in a direction transverse to the waveguide axis. Here the bias connections for the diode 21 are also shown. They include the very narrow strips of plating 43 and 44 which run from opposite beam-lead terminals of diode 21 across the quartz substrate 14 at maximum possible separation from the main stripline conductor 13 and filter sections 41 and 42, and eventually to terminals at which a d.c. bias source (not shown) is connected. The width of the d.c. bias connections 43 and 44 is illustratively about a fractional part of the normal width of the principal conductor 13 of the stripline.

Again the dielectric plate 15 is adapted primarily to affect the resistive impedance of the stripline 12' and the dielectric plate 16 is more deeply inserted through the opposite wall into the interior of waveguide 11 in order to affect the impedance of the waveguide more than the impedance of the stripline.

The descriptions of the foregoing embodiments show that beam-leaded solid-state devices can be coupled to waveguide transmission lines by means of a strip transmission line pattern and an adjustable dielectric impedance transformer. Ohmic losses are minimized because ohmic contacts between the strip transmission line and the waveguide are not necessary. The stripline matching network can be reproduced accurately by using photolithographic processing steps and the device carrier with the stripline pattern can be manufactured inexpensively in large quantities.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An electrical frequency conversion apparatus comprising a conductively-bounded waveguide, means for responding to guided waves therein via nonlinear conduction, said responding means comprising a planar transmission line penetrating said waveguide and having a dielectric substrate and at least one planar conductor plated on said substrate, a diode mounted on said substrate in said waveguide and connected to said line by a conductor forming a part of said transmission line, and d.c. bypass conductors plated on said substrate to enable biasing of said diode without substantially affecting said transmission line, and means for matching said responding means to said waveguide comprising an impedance-matching dielectric plate movable along said substrate which acts as a guiding surface for motion of said plate along said substrate inside and outside of said waveguide, whereby said waveguide and said planar transmission line may be respectively tuned.

2. A frequency conversion apparatus according to claim 1 in which the dielectric plate is disposed next to said dielectric substrate on the side opposite the diode.

3. A frequency conversion apparatus according to claim 2 in which dielectric plate and substrate have the combined thickness to act as a quarter wave matching transformer.

4. A frequency conversion apparatus according to claim 2 including a second dielectric plate disposed next to the dielectric substrate, the waveguide having a first opening through which the first dielectric plate passes and having a second opening through which said second dielectric plate passes.

5. A frequency conversion apparatus according to claim 4 in which the first and second openings are in opposite walls of the waveguide.

6. A frequency conversion apparatus according to claim 4 in which the first and second openings are less than one-half wavelength in their respective narrowest dimensions and the first and second dielectric plates are birefringent and of particular thicknesses causing them to act as quarter-wave plates when fully inserted into the waveguide.

7. In combination, a conductively bounded waveguide; means for responding to guided waves within said waveguide via nonlinear conduction, said responding means comprising a planar transmission line penetrating said waveguide and having a dielectric substrate, at least one planar conductor plated on said substrate, and a diode mounted on said substrate within said waveguide and connected to said line by a conductor forming a part of said transmission line; and an impedance-matching dielectric plate movable along said substrate which acts as a guiding surface for motion of said plate along said substrate inside and outside of said waveguide, whereby said waveguide and said planar transmission line may be respectively tuned.

8. The combination according to claim 7 in which the dielectric plate is disposed next to said dielectric substrate on the side opposite the diode and in which the dielectric plate and said substrate have the combined thickness to act as a quarter-wave matching transformer.

9. The combination according to claim 7 wherein the combination further includes a second dielectric plate movable along the dielectric substrate which acts as a guiding surface for motion of said second plate.

10. The combination according to claim 9 in which the second dielectric plate is movable along the side of said substrate opposite the diode and in which said second plate and said substrate have the combined thickness to act as a quarter wave matching transformer.

* * * * *